United States Patent [19]

Chapman et al.

[11] 3,917,561

[45] Nov. 4, 1975

[54] PROCESS FOR PREPARING MELT-STABLE POLY(DODECAMETHYLENETEREPH-THALAMIDE

[75] Inventors: Richard D. Chapman; Oscar A. Pickett, Jr., both of Pensacola, Fla.

[73] Assignee: Monsanto Company, St. Louis, Mo.

[22] Filed: Dec. 23, 1974

[21] Appl. No.: 535,741

Related U.S. Application Data

[63] Continuation-in-part of Ser. No. 456,101, March 29, 1974, abandoned.

[52] U.S. Cl. 260/45.75 C; 260/45.7 P; 260/45.7 R; 260/45.95 R; 260/78 SC; 260/78 S
[51] Int. Cl.² .......................................... C08G 6/00
[58] Field of Search ........ 260/78 SC, 78 S, 45.75 C, 260/45.7 P, 45.95 R, 45.7 R, 2.2 R; 23/312 A

[56] References Cited

UNITED STATES PATENTS

| | | | |
|---|---|---|---|
| 2,130,948 | 9/1938 | Carothers | 260/78 |
| 2,510,777 | 6/1950 | Gray | 260/45.7 |
| 2,705,227 | 3/1955 | Stamatoff | 260/45.7 |
| 3,373,145 | 3/1968 | Wagner | 260/78 |
| 3,423,183 | 1/1969 | Goetzke | 260/78 |
| 3,475,387 | 10/1969 | Carter et al. | 260/78 |
| 3,573,244 | 3/1971 | Wilken et al. | 260/45.8 |
| 3,642,210 | 2/1972 | Keen et al. | 260/78 |

OTHER PUBLICATIONS

"Amker-Hi-Lites" — Bulletin 92, Mar. 1966, publication of Rohm and Haas Co.
Ion Exchanges in Analytical Chemistry — by Samuelson 1953; John Wiley & Sons.
Dowex Ion Exchange — The Lakeside Press; 1958 publication pp 13 and 18 to 29.

*Primary Examiner*—V. P. Hoke
*Attorney, Agent, or Firm*—John W. Whisler

[57] ABSTRACT

Melt-stable, fiber-forming poly(dodecamethyleneterephthalamide) is provided by melt polymerization of a cation-exchange treated dodecamethylenediammoniumterephthalate salt in the presence of a sterically hindered phenol, benzenephosphinic acid, or copper acetate in combination with an alkali metal halide.

5 Claims, No Drawings

PROCESS FOR PREPARING MELT-STABLE POLY(DODECAMETHYLENETEREPHTHALAMIDE

REFERENCE TO OTHER APPLICATIONS

This application is a continuation-in-part application of application Ser. No. 456,101, filed Mar. 29, 1974 now abandoned.

BACKGROUND OF THE INVENTION

The high melting point, high glass transition temperature, relatively high modulus and low moisture sensitivity of yarns consisting of filaments of poly(dodecamethyleneterephthalamide),hereinafter referred to as 12TA, make it an attractive candidate for tire cord and for carpet or textile yarns. However, the commercial manufacture of 12TA yarn has not heretofore been practical.

The most economical process for commercially manufacturing 12TA yarns would be the conventional melt polymerization and melt spinning processes that are presently utilized in the commercial production of nylon 66 yarns. Unfortunately, heretofore useful 12TA yarns have not been produced by these processes for the reason that these processes require prolonged melt-handling of the 12TA polymer at temperatures above 300°C. Under these conditions the resulting 12TA polymer melt is not convertible to useful yarns; the melt is either too viscous or the polymer is thermally degraded.

A process for producing 12TA polymer is disclosed in U.S. Pat. No. 3,642,710. According to this process the polymerization of dodecamethylenediammoniumterephthalate, i.e. 12TA salt, is conducted in the solid state at lower temperatures and in the presence of a viscosity stabilizer, such as acetic acid, followed by rapid melt spinning at higher temperatures, e.g. 320° to 337°C. However, 12TA polymer made by this process is nevertheless unstable in the molten state and is not suitable for use in conventional continuous melt spinning processes where prolonged handling of molten polymer is required. British Pat. No. 1,070,416 discloses that 12TA type polyamides prepared by melt polymerization of the monomers in the presence of large amounts (3–8 mole percent) of a carboxylic acid viscosity stabilizer, such as terephthalic acid or acetic acid, are melt spinnable into yarn. However, yarn melt spun from polyamides produced in this way is difficult to molecularly orient and has inferior physical properties.

The present invention relates to a melt polymerization process for manufacturing melt-stable 12TA polymer. 12TA polymer made by the process of the present invention may be melt spun into useful yarn by conventional processes.

The term melt-stable 12TA polymer as used herein means 12TA polymer that may be maintained in the molten state at temperatures above its melting point (e.g. 300° to 340°C.) for prolonged periods of time (e.g. up to 1 hour or longer) and thereafter melt spun into high quality yarn by conventional melt spinning processes.

SUMMARY OF THE INVENTION

In accordance with the process of the present invention, there is provided melt-stable, fiber-forming 12TA polymer having an inherent viscosity between 0.4 and 1.0 that is melt spinnable by conventional processes into high quality yarn. The process comprises melt polymerization of cation-exchange treated 12TA salt in the presence of an additive consisting of benzenephosphinic acid ($C_6H_5PO_2H_2$) or a sterically hindered phenol or copper acetate in combination with an alkali metal halide or a mixture of two or more of these additives. Both the additive and the cation-exchange treated 12TA salt are essential features of the process, that is, when the process is carried out in the absence of the additive or when the 12TA salt is not cation-exchange treated, the resulting 12TA polymer is not melt-stable and is not melt spinnable by conventional processes into useful yarn.

Additives useful in carrying out the process of this invention have heretofore been incorporated into nylon 66 yarn to reduce degradation of the yarn in the presence of oxygen (e.g. air). However, the process of the present invention is carried out in the absence of oxygen under which condition these additives have no recognized affect on the polyamide. It is therefore surprising that these additives when used in the process of the present invention cooperate in some way with the cation-exchange treated 12TA salt to provide a melt-stable 12TA polymer.

The melt-stable 12TA polymer prepared by the process of the invention may be processed into yarn in a conventional manner, that is, it may be passed in the molten state directly from the polymerization vessel, e.g. autoclave, to a spinning machine, melt spun and then further processed into yarn or it may be made into flake which is subsequently melt-spun and processed into yarn.

DESCRIPTION OF THE PREFERRED EMBODIMENTS

The Additive

Additives useful in carrying out the process of this invention consist of benzenephosphinic acid

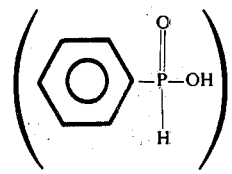

copper acetate in combination with an alkali metal halide, such as potassium or sodium iodide or bromide, a sterically hindered phenol, or mixtures of these additives.

Sterically hindered phenols useful as additives in practicing the invention are well known in the art and are characterized in containing one or more hydroxyphenyl radicals having, as substituents on at least one of the carbon atoms ortho to the hydroxy-containing carbon atom, a branched chained alkyl group containing 3 to 5 carbon atoms such as

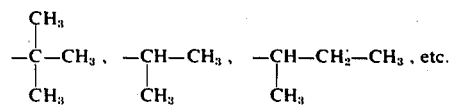

Preferred phenols are those containing at least one 4-hydroxyphenyl radical substituted at the 3,5 or 2,5 position with a tertiary butyl radical. Representative phenols are: bis(4-hydroxy-3,5-di-t-butylbenzyl)ether, 1,3,5-trimethyl-2,4,6-tris(4-hydroxy-3,5-di-t-butylbenzyl)benzene, 4,4'-butylidenebis(6-tert-butyl-m-cresol), 2,2'-methylenebis(4-methyl-6-tert-butylphenol), etc.

The amount of additive present during polymerization is not critical so long as the amount is sufficient to provide melt-stable 12TA polymer. It has been found that generally an amount within the ranges specified below will provide an effective amount of additive.

Phenol: 0.01–1.0% on weight of polymer formed
Benzenephosphinic Acid: 0.05–2% on weight of polymer formed

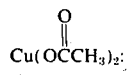

amount sufficient to provide 50–2000 ppm of Cu based on weight of polymer formed KI or NaI: 50–2000 ppm based on weight of polymer formed The weight of polymer formed is easily calculated from the amount of salt employed. It will be apparent to those skilled in the art that the effective amount of additive may vary from time to time depending upon reaction conditions and monomer purity. However, the optimum amount of additive may easily be determined by experimentation.

The 12TA Salt

12TA salt is conventionally made by mixing stoichiometric proportions of dodecamethylenediamine and terephthalic acid in water. Terephthalic acid is commercially used in large quantities in the manufacture of polyester yarns, i.e. polyethylene terephthalate yarns, and is commercially produced by the oxidation of paraxylene. It has been unexpectedly discovered that, while terephthalic acid produced in this way is considered a fiber-grade monomer and is used commercially in manufacturing polyester yarn, it apparently contains trace amounts of one or more unidentified materials that, when present during the polycondensation of 12TA salt, contribute significantly to the lack of stability of the resulting 12TA polymer in the molten state. In particular, the 12TA polymer when held in the molten state for prolonged periods of time (e.g. up to one-half hour) increases in melt viscosity to such an extent that it cannot be melt spun into fiber by conventional melt spinning processes. This increase in melt viscosity is apparently caused by cross-linking reactions and/or further polymerization. It has been found that a melt-stable 12TA polymer is obtained however by the melt polymerization process of the present invention in which a cation-exchange treated 12 TA salt is employed and polymerization is carried out in the presence of at least one of the above-identified additives.

Cation Exchange Treatment of 12TA Salt

The cation exchange treatment of 12TA salt may be accomplished by any of the conventional and well known techniques normally used for the purification of materials with cation exchange resins, for example, batch, column, moving bed or fixed bed operations. In batch operations a cation exchange resin may be added to a hot aqueous solution of 12TA salt and stirred for a short time. Normally, 1 to 30 minutes of stirring is adequate. The aqueous salt solution is preferably maintained at a temperature between about 85° to 100°C.

since the solubility of 12TA salt in water increases as the temperature of the water increases. The resulting hot mixture is then filtered to remove the resin and the filtrate is cooled to effect crystallization of 12TA salt which is then recovered by filtration and then dried. In the column operation an aqueous solution of 12TA salt (85° to 100°C.) is passed through a column filled with cation exchange resin.

Any cation exchange resin may be used in accomplishing the cation exchange treatment of the 12TA salt. Preferred resins are those of the nuclear sulfonic type in the hydrogen form represented by the formula $RSO_3H$. This type of resin is commercially available, for example, the cation exchange resin sold by Rhom and Haas under the trade name Amberlite IR-120 and the resin sold by Dow Chemical Company under the trade name Dowex 50. However, if desired, other types of cation exchange resins such as the phenolic methyl sulfonic, carboxylic and sulfonated styrene-butadiene copolymeric types of cation exchange resins may also be used. If the resin is not initially in the hydrogen form it may be easily converted to the hydrogen form by treatment thereof with dilute sulfuric acid.

Treatment of 12TA salt with a cation exchange resin is believed to involve the reaction, $RSO_3H + A^+ \rightleftharpoons RSO_3A + H^+$
where the cation $A^+$ (impurity) of the 12TA salt and $H^+$ (hydrogen) of the resin are exchanged. Since the reaction is an equilibrium reaction, the resin, of course, is used in excess so as to drive the above reaction to the right. Since only trace amounts of impurity are presented in 12TA salt, the amount of resin required to treat a given amount of 12TA salt is very small, for example, 0.5 to 5.0 grams of resin per 100 grams of 12TA salt. In a column operation the resin is always present in excess of the amount required for the treatment of 12TA salt. After the resin is used in treating 12TA salt, the resin is converted to the hydrogen form for reuse by merely treating it with dilute sulfuric acid. A further discussion of cation exchange resins appears in the book entitled "Dowex Ion Exchange" published by the Lakeside Press, R. R. Donnelley and Sons Company, Chicago, Illinois, and Crawfordsville, Indiana.

While it is strongly believed that cation exchange treatment of 12TA salt in the manner just described involves the exchange of cations (impurities) in the 12TA salt with hydrogen atoms in the resin, it is possible that instead of or in addition to this exchange the resin may be functioning as a catalyst for same reaction on the salt and/or resin molecules or some fragment thereof may be added to the salt which functions as a catalyst in polymerization of the salt. However, regardless of the exact mechanism or mechanisms involved in the cation exchange treatment of 12TA salt, the present invention provides melt-stable 12TA polymer, whereas if the treatment is omitted the resulting 12TA polymer is not melt-stable.

Process Conditions

The process is carried out in three stages or cycles using essentially the same procedures that are conventionally used in the manufacture of nylon 66, with the exception that higher temperatures and pressures are employed in the instant process. In the first cycle an aqueous solution of cation-exchange treated 12TA salt and an appropriate amount of the previously described additive is placed in a vessel (e.g. autoclave) and the vessel is pressurized with an inert gas, such as nitrogen, to a pressure of from 250 to 500 psig. The solution is then gradually heated to a temperature between 285° and 320°C. while removing water from the vessel as steam and while maintaining said pressure. In the second cycle the resulting molten mass is heated to a temperature between 300° and 330°C. while the pressure in the vessel is reduced to atmospheric pressure. In the last cycle the molten mass is held at the conditions existing at the conclusion of the second cycle, i.e. at atmospheric pressure and at a temperature between 300° and 330°C. The process may be carried out continuously or as a batch process.

In the examples, parts and percentages are by weight unless otherwise specified and the following abbreviations are used therein:

12TA — poly(dodecamethyleneterephthalamide);
12TA salt — dodecamethylenediammoniumterephthalate;
12TA/CE salt — cation-exchange treated 12TA salt;
TA — commercially available terephthalic acid made by oxidation of para-xylene;
12DA — dodecamethylenediamine;
Additive A — benzenephosphinic acid;
Additive B — bis[4-hydroxy-3,5-di-t-butylbenzyl]ether;
Additive C — copper acetate and potassium iodide.

Polymer viscosities given herein are intrinsic viscosities $[\eta]$ and are determined using the following procedure:

Into a clean, dry, two-ounce bottle is placed $0.1004 \pm 0.0001$ grams of dried 12TA polymer. Reagent grade sulfuric acid (25 ml.) is added to the bottle. The bottle is capped, placed on a shaker and shaken until the polymer is completely dissolved. The solution is filtered through a coarse porosity fritted glass funnel into a clean, dry, 2-ounce bottle. A predetermined amount of solution is then transferred from this bottle into a 200 Series Cannon-Fenske viscometer. The viscometer is placed in a $25° \pm 0.1°C$. constant temperature bath for 15 minutes. The efflux time of the polymer solution from the viscometer is recorded and the average of three flow times that agree with $\pm 0.2$ seconds is used to calculate the intrinsic viscosity according to the formula:

$$[\eta] = \sqrt{2}/C \, (\eta_{sp} - Ln \, \eta_{rel})^{1/2}$$

where
$[\eta]$ = intrinsic viscosity
$C$ = concentration in grams/deciliter
$\eta_{sp} = t_s/t_o - 1$, where $t_s$ is average flow time of solution and $t_o$ is average flow time of solvent
$Ln \, \eta_{rel}$ = natural log of $t_s/t_o$
The $t_o$ values are determined by using solvent in place of polymer solution.

EXAMPLE 1

This example illustrates the melt polymerization of 12TA/CE salt according to the process of the present invention.

12TA salt (200 parts), prepared from TA and recrystallized 12DA, was dissolved in 4500 ml. of hot deionized water and 2 g. of wet Amberlite IR-120 cation exchange resin in the hydrogen form was added thereto, and stirred for 15 minutes. The resulting mixture was then filtered, cooled and the salt crystals filtered and dried to provide 12TA/CE salt.

Fifty (50) parts 12TA/CE salt, 20 parts of deionized water, 0.7 parts of a 20% aqueous $TiO_2$ slurry, 0.02 parts of bis(4-hydroxy-3,5,di-t-butylbenzyl)ether (Additive B), 0.3 parts of a 1.2% aqueous solution of manganous hypophosphite and 0.27 parts of recrystallized 12DA (as viscosity stabilizer) were mixed by stirring in an autoclave purged with purified nitrogen. The autoclave was then heated with stirring while maintaining the pressure therein at 250 psig. At 220°C. water began to boil off and was removed from the autoclave as steam. Heating was continued until the temperature in the autoclave reached 295°–300°C. Then, the pressure was reduced to atmospheric pressure over a 25 minute period while the temperature of the molten polymer in the autoclave was increased to 315°C. with stirring. The molten 12TA was then equilibrated by heating an additional 30 minutes at a temperature of 310°–320°C. to remove any water vapor present in the melt. The molten polymer was easily extruded from the autoclave. The polymer had an intrinsic viscosity of 0.514.

EXAMPLE 2–4

Examples 2–4 demonstrate that, if the process of the present invention is carried out in the absence of the additive described herein and/or using a 12TA salt instead of a 12TA/CE salt, the resulting molten 12TA is not melt-stable and is too viscous to be melt spun into fiber.

In example 2, 100 parts of 12TA salt, 33 parts of deionized water, and 0.55 parts of recrystallized 12DA were mixed in an autoclave and heated using the same techniques and procedures described in example 1. At the conclusion of the pressure reduction cycle, the viscosity of the molten 12TA had increased to such a level that the stirrer stopped. Heating was continued at 310°–320°C. for 30 minutes. The polymer was too viscous to be extruded from the autoclave into fibers. When cooled, the polymer was insoluble in concentrated $H_2SO_4$.

In example 3, 50 parts of 12TA/CE salt, 17 parts of deionized water, and 0.28 parts of recrystallized 12DA were charged to an autoclave and heated as described in example 1. In this instance the stirrer did not stop. However, the molten polymer was not melt-spinnable due to its high viscosity. The cooled polymer was soluble in concentrated $H_2SO_4$ and had an intrinsic viscosity $[\eta]$ of 1.30.

In example 4, 50 parts of 12TA salt, 20 parts of deionized water, 0.7 parts of 20% aqueous $TiO_2$ slurry, 0.02 parts of Additive B, and 0.3 parts of a 1.2% aqueous solution of manganous hypophosphite were mixed in an autoclave and heated as described in example 1. The stirrer stopped at the conclusion of the pressure reduction cycle and the molten 12TA was too viscous to be extruded from the autoclave into fiber.

EXAMPLES 5–7

These examples illustrate the preparation of a melt-stable 12TA according to the process of the invention. In each example the ingredients listed below were charged to an autoclave and heated following the procedures and techniques described in example 1.

| Ingredient | Example No. (Amounts by Parts) | | |
|---|---|---|---|
| | 5 | 6 | 7 |
| 12TA/CE salt | 61 | 407 | 61 |

-continued

| Ingredient | Example No. (Amounts by Parts) | | |
|---|---|---|---|
| | 5 | 6 | 7 |
| Deionized Water | 20 | 130 | 20 |
| Additive | A/0.05 | C/9.72[1] | A/0.05 |
| 1.2% aqueous solution of manganous hypophosphite | 0.2 | — | 0.2 |
| 20% aqueous solution of TiO$_2$ | 0.75 | — | 0.75 |
| Excess 12DA | — | 5.5 | 0.66 |

[1] 0.72 parts of KI and 9.0 parts of a 1% aqueous solution of Cu(OCCH$_3$)$_2$·H$_2$O
$\|$
O In each examples after the 30 minute equilibrium cycle the molten polymer was extruded directly from the autoclave into a fiber. The intrinsic viscosities were:

| Example 5 | Example 6 | Example 7 |
|---|---|---|
| 0.56 | 0.88 | 0.80 |

EXAMPLE 8

This example illustrates the melt stability of 12TA prepared by the process of this invention.

12TA/CE salt (100 parts), 32 parts of deionized water, 0.08 parts of Additive A and 1.35 parts of excess 12DA were charged to an autoclave and heated as described in example 1. At the end of the polymerization, the melt was sampled by extrusion from the autoclave. Samples were taken at ½ hour intervals. At the end of 4 hours the melt remaining in the autoclave was still extrudable into fiber. The [η] viscosity of the individual samples was measured with the following results.

| Time, hours | 0 | 0.5 | 1.0 | 1.5 | 2.0 | 2.5 | 3.0 |
|---|---|---|---|---|---|---|---|
| [η] | 0.66 | 0.66 | 0.69 | 0.72 | 0.73 | 0.78 | 0.80 |

EXAMPLE 9

This example illustrates melt spinning of 12TA prepared by the process described herein.

12TA/CE salt (1200 parts), 400 parts of deionized water, 12.3 parts of excess 12DA, 1.08 parts of Additive A, 2.12 parts of KI and 10 parts of a 2.7% aqueous solution of

H$_2$O were charged to an autoclave and heated as described in example 1. Two batches were similarly prepared and ground. The [η]'s were 0.67 and 0.86. The batches were blended and fed to a ¾ inch × 24 inch screw extruder equipped with a meter pump and 28-hole spinneret assembly. The back zone of the screw was maintained at 270° ± 5°C., the front zone at 320°C., the screw head at 310° ± 5°C., the pump block at 307° ±2°C., and the spinneret assembly at 313° ± 3°C. The yarn was collected at a speed which resulted in a yarn having a denier of 700. The [η] of the yarn was 0.80. The yarn was drawn 4 times its length on godets over a hot pin to give a 181 denier yarn with a tendency of 3.36 gpd at 16% elongation.

We claim:

1. A process for the preparation of melt-stable, fiber-forming poly(dodecamethyleneterephthalamide) by melt polymerization comprising
   A. heating an aqueous solution of cation-exchange treated dodecamethylenediammoniumterephthalate in the presence of an additive consisting of a sterically hindered phenol, or benzenephosphinic acid, or copper added as copper acetate in combination with an alkali metal halide, or mixtures thereof in a vessel pressurized with an inert gas to a pressure ranging from 250 to 500 psig to a temperature between 285° and 320°C. while removing water from said vessel in the form of steam and while maintaining said pressure;
   B. heating the resulting molten polymer to a temperature between 300° and 330°C. while reducing the pressure in said vessel to atmospheric pressure; and
   C. holding said molten polymer at atmospheric pressure and at a temperature between 300° and 330°C. for a period of time sufficient to bring said molten polymer to equilibrium.

2. The process of claim 1 wherein said additive consists of from 0.05 to 2.0 percent by weight, based on the weight of polymer formed of benzenephosphinic acid.

3. The process of claim 1 wherein said additive consists of from 0.01 to 1.0 percent by weight, based on the weight of polymer formed, of a sterically hindered phenol.

4. The process of claim 1 where said additive consists of from 0.005 to 0.2 percent by weight, based on the weight of polymer formed, of copper, added as copper acetate, and from 0.005 to 0.2 percent by weight, based on the weight of polymer formed, of an alkali metal halide.

5. The process of claim 1, wherein said cation-exchange treated dodecamethylenediammoniumterephthalate was treated with a sulfonic type resin in hydrogen form.

* * * * *